United States Patent [19]
Ishimitsu

[11] Patent Number: 6,067,513
[45] Date of Patent: May 23, 2000

[54] SPEECH RECOGNITION METHOD AND SPEECH RECOGNITION APPARATUS

[75] Inventor: Shunsuke Ishimitsu, Kawagoe, Japan

[73] Assignee: Pioneer Electronic Corporation, Tokyo-To, Japan

[21] Appl. No.: 09/176,302

[22] Filed: Oct. 22, 1998

[30] Foreign Application Priority Data

Oct. 23, 1997 [JP] Japan ................................. 9-290731

[51] Int. Cl.$^7$ ............................. G10L 13/00; G10L 15/00
[52] U.S. Cl. .......................... 704/233; 704/226; 704/256
[58] Field of Search ................................... 704/233, 226, 704/256

[56] References Cited

U.S. PATENT DOCUMENTS

| | | | |
|---|---|---|---|
| 4,897,878 | 1/1990 | Boll et al. ................................. | 704/233 |
| 5,148,489 | 9/1992 | Erell et al. ................................. | 704/226 |
| 5,742,928 | 4/1998 | Suzuki ................................. | 704/239 |
| 5,893,059 | 4/1999 | Raman ................................. | 704/256 |
| 5,924,065 | 7/1999 | Eberman et al. ........................ | 704/231 |

OTHER PUBLICATIONS

F. Martin et al., "Recognition of Noisy Speech by Composition of Hidden Markov Models", Technical Report of IEICE, pp. 9–16, 1992.

*Primary Examiner*—David R. Hudspeth
*Assistant Examiner*—Daniel Abebe
*Attorney, Agent, or Firm*—Finnegan, Henderson, Farabow, Garrett, & Dunner, L.L.P.

[57] ABSTRACT

A speech recognition method of recognizing an input speech in a noisy environment by using a plurality of clean speech models is provided. Each of the clean speech models has a clean speech feature parameter S representing a cepstrum parameter of a clean speech thereof. The speech recognition method has the processes of: detecting a noise feature parameter N representing a cepstrum parameter of a noise in the noisy environment, immediately before the input speech is input; detecting an input speech feature parameter X representing a cepstrum parameter of the input speech in the noisy environment; calculating a modified clean speech feature parameter Y according to a following equation:

$$Y = k \cdot S + (1-k) \cdot N \quad (0 < k \leq 1),$$

where the "k" is a predetermined value corresponding to a signal-to-noise ratio in the noise environment; comparing the input speech feature parameter X with the modified clean speech feature parameter Y; and recognizing the input speech by repeatedly carrying out the calculating process and the comparing process with respect to the plurality of clean speech models.

12 Claims, 12 Drawing Sheets

FIG.11

|  | 0 km/h | 50 km/h | 100 km/h | 50 km/h with MUSIC | 100 km/h with MUSIC |
|---|---|---|---|---|---|
| CONVENTIONAL APPARATUS 400 | 83.7 % | 40.7 % | 33.3 % | 25.7 % | 24.7 % |
| APPARATUS OF THE INVENTION 100 | 94.7 % | 85.0 % | 83.7 % | 63.3 % | 64.4 % |
| IMPROVING EFFECT | 1.1 (times) | 2.1 | 2.5 | 2.4 | 2.6 |

SPEECH RECOGNITION METHOD AND SPEECH RECOGNITION APPARATUS

BACKGROUND OF THE INVENTION

1. Field of the Invention

The present invention relates to a speech recognition apparatus and method which can recognize speech in a noisy environment such as in a car.

2. Description of the Related Art

In recent years, speech recognition interfaces and speech recognition apparatuses are going to become popular. A typical speech recognition apparatus recognizes a speech input through an input device, such as a microphone, by comparing the input speech with models of speech, words or phonemes (Hereinafter, they are referred to as "speech models".) stored in advance in a memory device.

In a car which is running, there are a variety of noises, such as a frictional noise between tires and a road surface, a noise of wind, a sound of music from a car stereo and so on. If the speech recognition is performed in such a noisy environment, not only human voice but also noises are input through a microphone, so that accuracy of the speech recognition goes down.

If the distance between the microphone and the mouth of the car driver is very short, it is possible to increase accuracy of the speech recognition in the car. However, it is undesirable for safety that the car driver moves his or her head near the microphone during driving. If a headset type microphone is used, the microphone can be always positioned near the mouth of the car driver. However, this gives the car driver an unpleasant feeling.

On the other hand, if the speech models are modified so as to be adapted to the noisy environment, it is also possible to increase accuracy of the speech recognition in the car. In a paper "Recognition of noisy speech by composition of hidden Markov models" by F. Martin, K. Shikano, Y. Minami and Y. Okabe published in Technical Report of IEICE (the Institute of Electronics, Information and Communication Engineers), SP92-96, pp. 9–16, December 1992, a method of combining a hidden Markov model (Hereinafter, it is referred to as an "HMM".) of clean speech and an HMM of a noise is described. According to this paper, an HMM of a combination of a clean speech and noise can be generated by a following equation (1).

$$X = \Gamma^{-1} \log(e^S + k \cdot e^N) \quad (1)$$

In this equation (1), the "X" represents a feature parameter of the HMM of the combination of the clean speech and noise, the "S" represents a feature parameter of the HMM of the clean speech, the "N" represents a feature parameter of the HMM of the noise, the "k" represents a value corresponding to the signal-to-noise ratio, the "$\Gamma$" represents a Fourier transform.

The feature parameter X, S and N are linear predictive coding (LPC) cepstrum parameters. Therefore, in order to combine the feature parameter S and the feature parameter N, a number of complex calculations, such as a Fourier transform, an exponential transform, a logarithm transform and an Inverse Fourier transform, are required, as shown in FIG. 1. Carrying out such complex calculations with a computer takes a long time.

If the speech recognition using the equation (1) is adapted to a car navigation apparatus, the response speed of the apparatus is very slow.

In a car navigation apparatus, a speech recognition is used as a man-machine interface for inputting information, for example, a destination. A word representing a destination, namely, a place name is relatively short, and consists of a small number of phonemes. In the case of the speech recognition for a car navigation apparatus, the total vocabulary is relatively small. Therefore, the speech recognition using rigorous processes, like the equation (1), may not be required. In order to increase the response speed of the car navigation apparatus, it is necessary to make the speech recognition processes simpler.

SUMMARY OF THE INVENTION

It is therefore an object of the present invention to provide a speech recognition method and apparatus which can increase a speed of speech recognition without great degradation of accuracy of the speech recognition in a noisy environment.

A cepstrum is calculated by performing an inverse Fourier transform on the logarithm of the spectrum of a speech signal (e.g., which is input through a microphone). Assuming that the frequency characteristic of the speech signal (i.e., the envelope of the spectrum of the speech signal) is regarded as a wave form, the cepstrum is the spectrum of this wave form. Therefore, it can be intuitively understood that, if large vibrations clearly appear in the wave form, the cepstrum is large, and if vibrations of the wave form are relatively small, the cepstrum is small, and further, if there are few vibrations in the wave form, the cepstrum is very small.

As a clean speech does not include a noise component, large vibrations clearly appear in the wave form of the spectrum of the clean speech. Therefore, the cepstrum of the clean speech is relatively large. In contrast, an input speech includes a noise component because the input speech is detected together with a noise in a noisy environment. Therefore, the vibrations of the wave form of the spectrum of the input speech are relatively small, so that the cepstrum of the input speech is smaller than the cepstrum of the clean speech. Furthermore, as there are few vibrations in the wave form of the spectrum of a noise, the cepstrum of the noise is smaller than the cepstrum of the input speech. Thus, the cepstrum of the input speech is between the cepstrum of the noise and the cepstrum of the clean speech.

Further, the cepstrum of the input speech is decided by the signal-to-noise ratio of the noisy environment. If the amount of the noise component is relatively large, the cepstrum of the input speech approaches the cepstrum of the noise. If the amount of the noise component is relatively small, the cepstrum of the input speech approaches the cepstrum of the clean speech.

As a result, the cepstrum "X" of the input speech can be calculated by the following equation (2).

$$X = k \cdot S + (1-k) \cdot N \quad (2)$$

where the "S" is the cepstrum of the clean speech, the "N" is the cepstrum of the noise, and the "k" is the value corresponding to the signal-to-noise ratio (mixing ratio).

In addition, the equation (2) is not rigorous in theory. However, the cepstrum of the input speech can be approximately calculated by the equation (2). The cepstrum of the input speech calculated by the equation (2) can be sufficiently used for a speech recognition for short words and relatively small vocabulary, such as the speech recognition for a car navigation apparatus.

Further, it should be noted that the equation (2) is very simple formula, so that the calculation can be performed quickly.

Here, the input speech includes a noise component. Namely, the input speech is a combination or mixture of a clean speech and a noise. From this point of view, the cepstrum of a combination of a clean speech and a noise can be calculated by the equation (2). As described below, a first speech recognition method, a second speech recognition method, a first speech recognition apparatus and a second speech recognition apparatus of the present invention use this technique.

According to the first speech recognition method of the present invention, the above mentioned object can be achieved. In the speech recognition method of the present invention, an input speech in a noisy environment is recognized by using a plurality of clean speech models. Each of the clean speech models has a clean speech feature parameter S representing a cepstrum parameter of a clean speech thereof. Further, the speech recognition method of the present invention has the processes of: detecting a noise feature parameter N representing a cepstrum parameter of a noise in the noisy environment, immediately before the input speech is input; detecting an input speech feature parameter X representing a cepstrum parameter of the input speech in the noisy environment; calculating a modified clean speech feature parameter Y according to a following equation:

$$Y = k \cdot S + (1-k) \cdot N \quad (0 < k \leq 1), \tag{3}$$

where the "k" is a predetermined value corresponding to a signal-to-noise ratio in the noisy environment; comparing the input speech feature parameter X with the modified clean speech feature parameter Y; and recognizing the input speech by repeatedly carrying out the calculating process and the comparing process, respectively, with respect to clean speech models.

In the equation (3), the modified clean speech feature parameter Y represents the cepstrum parameter of the combination of the clean speech and the noise. The cepstrum parameter of the noise that is detected in the noisy environment immediately before the input speech is input is used in the equation (3). Therefore, the modified clean speech feature parameter Y represents the cepstrum parameter of the combination of the clean speech and the noise in the noisy environment at the moment. Hence, it is possible to modify the clean speech models so as to match the noisy environment, even if the noisy environment is changed. Consequently, the accurate speech recognition can be achieved. Further, it should be noted an important thing of the equation (3). This is that the equation (3) is very simple formula. Therefore, the calculation process can be quickly performed. Thus, it is possible to increase response speed of the speech recognition.

The above mentioned object can be also achieved by a second speech recognition method of recognizing an input speech in a noisy environment by using a plurality of clean speech models, each of the clean speech models having a clean speech feature parameter S representing a cepstrum parameter of a clean speech thereof, the speech recognition method having the processes of: detecting a noise feature parameter N representing a cepstrum parameter of a noise in the noisy environment, immediately before the input speech is input; detecting an input speech feature parameter X representing a cepstrum parameter of the input speech in the noisy environment; calculating a modified input speech feature parameter Z according to a following equation:

$$Z = \{X - (1-k) \cdot N\}/k \quad (0 < k \leq 1), \tag{4}$$

where the "k" is a predetermined value corresponding to a signal-to-noise ratio in the noisy environment; comparing the modified input speech feature parameter Z with the clean speech feature parameter S; and recognizing the input speech by repeatedly carrying out the calculating process and the comparing process, respectively, with respect to the plurality of clean speech models.

In the equation (4), the modified input speech feature parameter Z represents the cepstrum parameter of the input speech from which the noise component is subtracted. The cepstrum parameter of the noise that is detected in the noisy environment immediately before the input speech is input is used in the equation (4). Therefore, the modified input speech feature parameter Z represents the cepstrum parameter of the input speech from which the noise in the noisy environment at the moment is subtracted. Hence, it is possible to make the modified input speech closer to the clean speech, even if the noisy environment is changed. Consequently, the accurate speech recognition can be achieved. Further, it should be noted an important thing of the equation (4). This is that the equation (4) is very simple formula. Therefore, the calculation process can be quickly performed. Thus, it is possible to increase response speed of the speech recognition.

Furthermore, the above mentioned object can be also achieved by a first speech recognition apparatus for recognizing an input speech in a noisy environment by using a plurality of clean speech models, each of the clean speech models having a clean speech feature parameter S representing a cepstrum parameter of a clean speech thereof, the speech recognition apparatus having: a first detecting device for detecting a noise feature parameter N representing a cepstrum parameter of a noise in the noisy environment, immediately before the input speech is input; a second detecting device for detecting an input speech feature parameter X representing a cepstrum parameter of the input speech in the noisy environment; a calculating device for calculating a modified clean speech feature parameter Y according to a following equation:

$$Y = k \cdot S + (1-k) \cdot N \quad (0 < k \leq 1),$$

where the "k" is a predetermined value corresponding to a signal-to-noise ratio in the noisy environment; and a comparing device for comparing the input speech feature parameter X with the modified clean speech feature parameter Y in order to recognize the input speech.

Furthermore, the above mentioned object can be also achieved by a second speech recognition apparatus for recognizing an input speech in a noisy environment by using a plurality of clean speech models, each of the clean speech models having a clean speech feature parameter S representing a cepstrum parameter of a clean speech thereof, the speech recognition apparatus having: a first detecting device for detecting a noise feature parameter N representing a cepstrum parameter of a noise in the noisy environment, immediately before the input speech is input; a second detecting device for detecting an input speech feature parameter X representing a cepstrum parameter of the input speech in the noisy environment; a calculating device for calculating a modified input speech feature parameter Z according to a following equation:

$$Z = \{X - (1-k) \cdot N\}/k \quad (0 < k \leq 1),$$

where the "k" is a predetermined value corresponding to a signal-to-noise ratio in the noisy environment; and a comparing device for comparing the modified input speech feature parameter Z with the clean speech feature parameter S in order to recognize the input speech.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 11 is a chart showing results of test of speech recognition;

DETAILED DESCRIPTION OF THE PREFERRED EMBODIMENTS

Referring to the accompanying drawings, embodiments of the present invention will be described. In the description set forth hereinafter, the present invention is embodied in a speech recognition apparatus for a car navigation system.

1. Principle of the Invention

First, the principle of the present invention will be described with reference to FIGS. 2 and 3.

A cepstrum is calculated by performing an inverse Fourier transform on the logarithm of the spectrum of a speech signal. Assuming that the frequency characteristic of the speech signal (i.e., the envelope of the spectrum of the speech signal) is regarded as a wave form, the cepstrum is the spectrum of this wave form.

Figure 2:
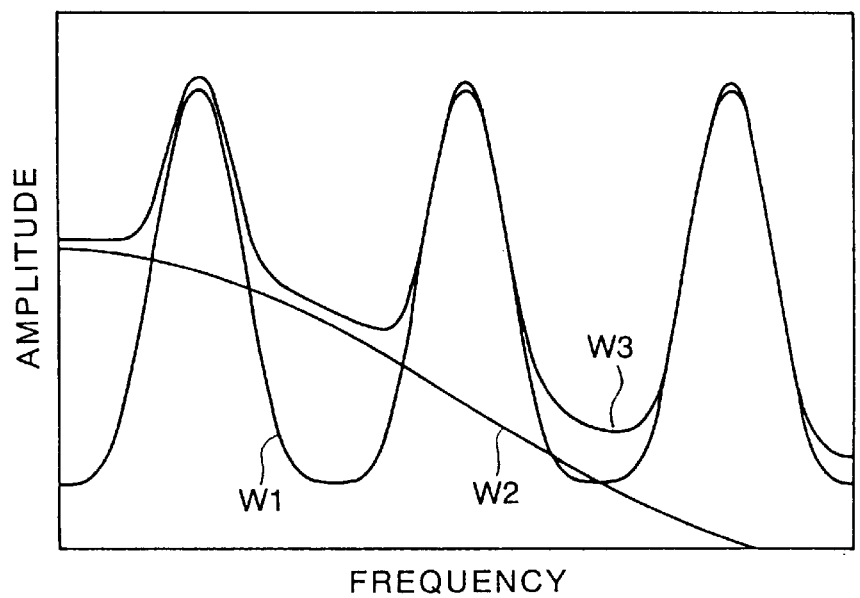
FIG. 2 is a diagram showing spectrums of a clean speech, a noise, and an input speech.

FIG. 2 shows wave forms of the spectrums of a clean speech signal, a noise and an input speech signal. In FIG. 2, a wave form W1 represents the spectrum of the clean speech signal which includes no noise component. A wave form W2 represents the spectrum of the noise in the noisy environment. A wave form W3 represents the spectrum of the input speech signal which includes a noise component in the noisy environment. FIG. 3 shows cepstrums corresponding to the wave forms, respectively. In FIG. 3, a cepstrum S represents the cepstrum of the clean speech signal. A cepstrum N represents the cepstrum of the noise. A cepstrum X represents the cepstrum of the input speech signal.

Figure 3:
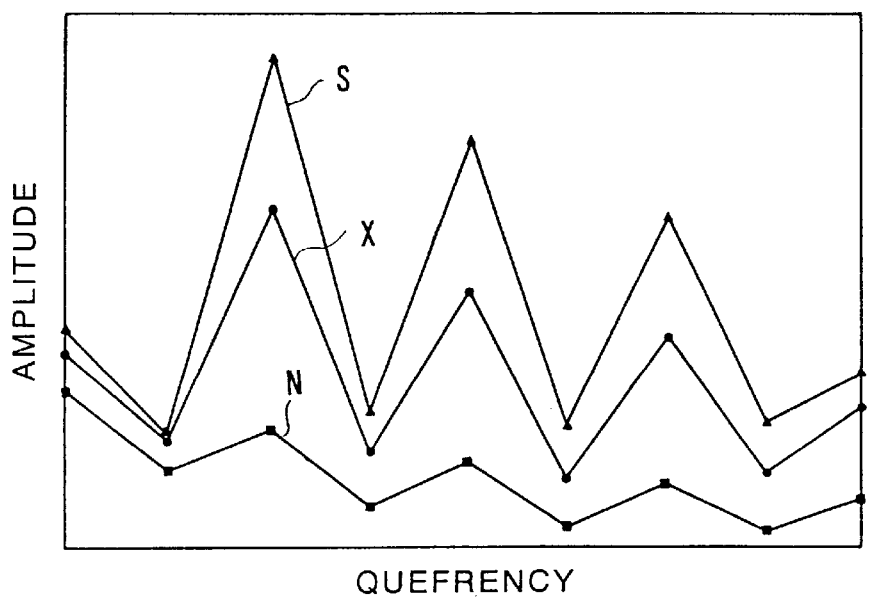
FIG. 3 is a diagram showing cepstrums of the clean speech, the noise, and the input speech.

As shown in FIGS. 2 and 3, the wave form W1 has large vibrations, so that the corresponding cepstrum S is large.

Namely, the cepstrum of the clean speech is larger than any other cepstrums N and X. The wave form W2 has almost no vibrations, so that the corresponding cepstrum N is very small. Namely, the cepstrum N of the noise is smaller than any other cepstrums S and X. The wave form W3 has small vibrations as compared to the wave form W1, so that the corresponding cepstrum X is between the cepstrums S and N.

Further, the cepstrum X of the input speech is decided by the signal-to-noise ratio of the noisy environment. If the amount of the noise component is relatively large, the cepstrum X of the input speech approaches the cepstrum N of the noise. If the amount of the noise component is relatively small, the cepstrum X of the input speech approaches the cepstrum S of the clean speech signal.

As a result, the cepstrum X of the input speech can be calculated by the following equation (5), which is the same as the aforementioned equation (2).

$$X = k \cdot S + (1-k) \cdot N \quad (0 < k \leq 1) \tag{5}$$

where the "k" is the value corresponding to the signal-to-noise ratio (mixing ratio). This principle is used for the speech recognition apparatus according to the embodiments of the present invention.

Here, the input speech includes a noise component. Namely, the input speech is a combination or mixture of a clean speech and a noise. From this point of view, the cepstrum of a combination of a clean speech signal and a noise can be calculated by the equation (5). The present invention uses this aspect.

2. First Embodiment of the Invention

Next, a first embodiment of the present invention will be described with reference to FIGS. 4 through 6.

Figure 4:
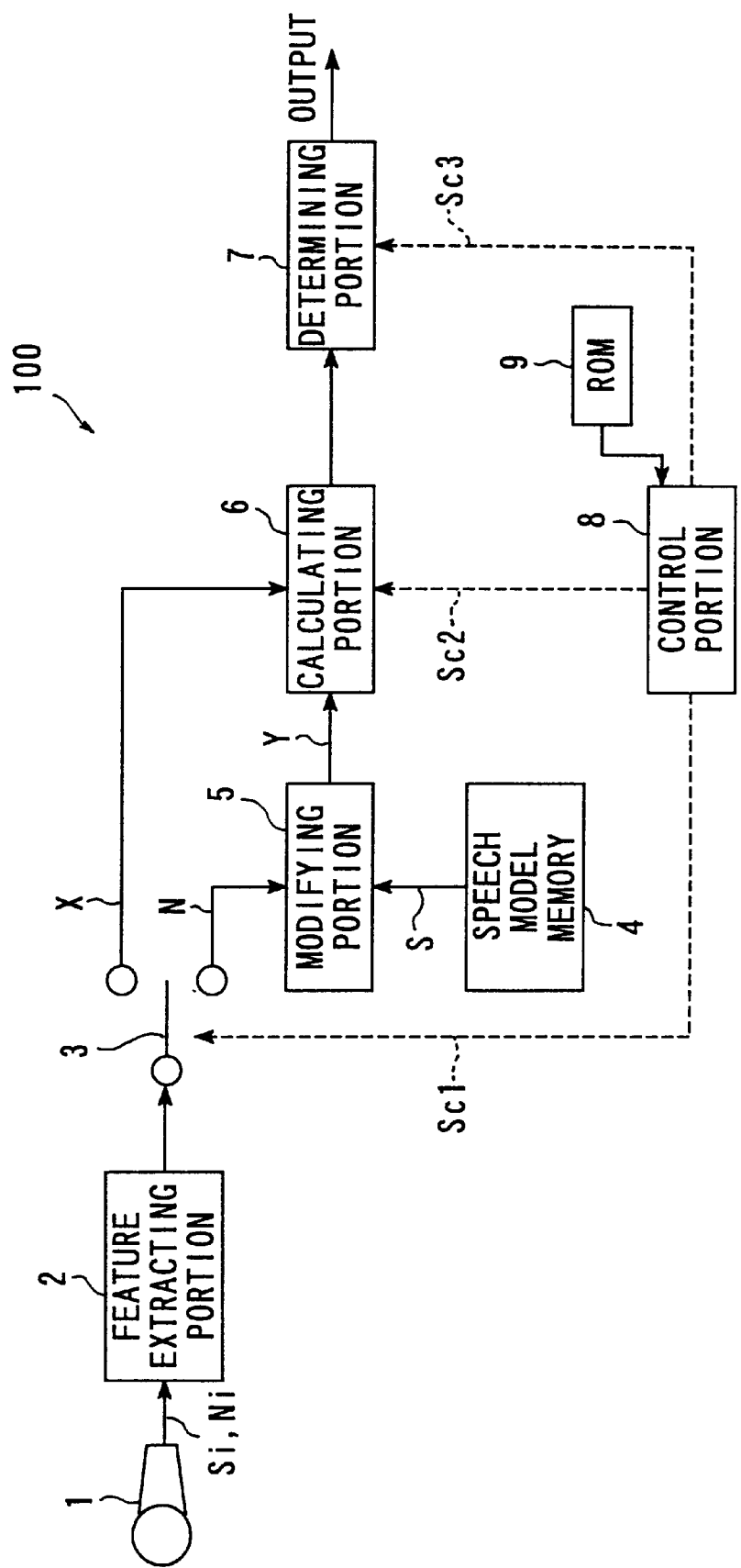
FIG. 4 is a block diagram showing a speech recognition apparatus of a first embodiment of the present invention.
Figure 5:
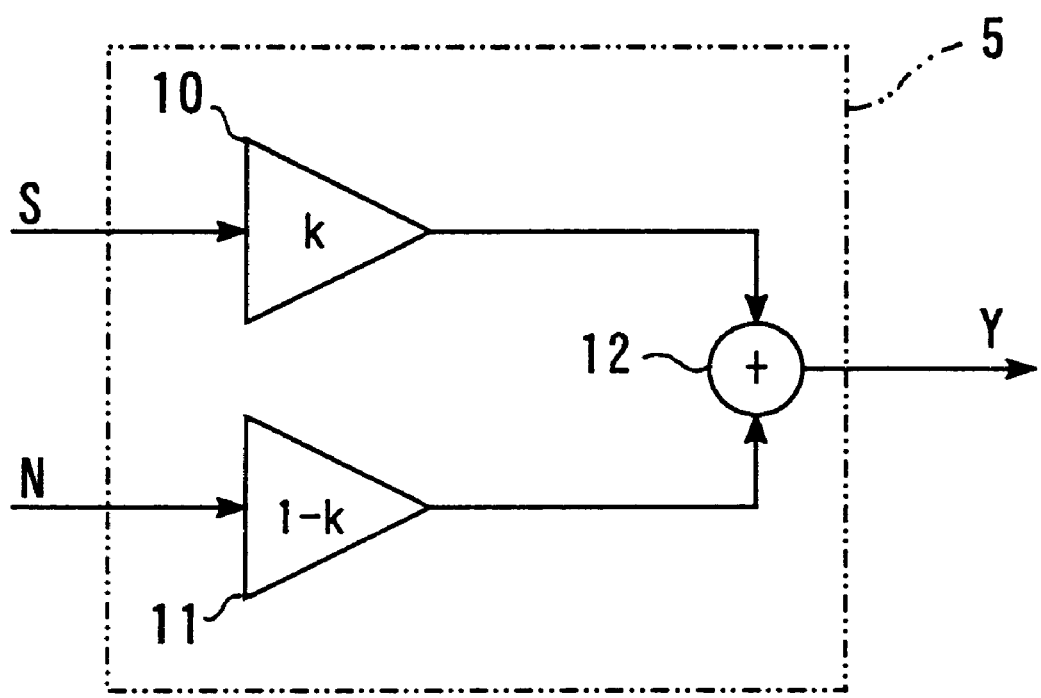
FIG. 5 is a block diagram showing a modifying portion of the speech recognition apparatus of the first embodiment.

FIG. 4 shows a speech recognition apparatus 100 of the first embodiment of the present invention. The speech recognition apparatus 100 is mounted in a car. The speech recognition apparatus 100 performs speech recognition in a noisy environment, such as in the car which is running. The speech recognition apparatus 100 performs the speech recognition by using HMMs.

As shown in FIG. 4, the speech recognition apparatus 100 has a microphone 1, a feature extracting portion 2, a switch 3, a speech model memory 4, a modifying portion 5, a calculating portion 6, a determining portion 7, a control portion 8 and ROM (Read Only Memory) 9. Further, the modifying portion 5, as shown in FIG. 5, has a couple of multipliers 10, 11, and an adder 12.

The microphone 1 is an input device for inputting an input speech signal or a noise. The microphone 1 is attached on the sun visor or the dash board of the car, for example.

The feature extracting portion 2 operates to generate a feature parameter of the input speech signal or the input noise, respectively. More concretely, the feature extracting portion 2 performs an analog-digital conversion on the input speech signal or the input noise, divides the input speech signal or the input noise into frames having predetermined frame length (window length), and calculates the cepstrum of the input speech signal or the input noise for each frame. The cepstrum is the feature parameter of the input speech or the input noise.

The switch 3 connects the output of the feature extracting portion 2 to the input of the modifying portion 5 when a noise is input thought the microphone 1, and connects the output of the feature extracting portion 2 to the input of the calculating portion 6 when the input speech signal is input through the microphone 1.

The speech model memory 4 is a storage device for storing a plurality of HMMs of speech, words or phonemes.

The speech recognition apparatus 100 of the first embodiment uses a continuous HMM of left-to-right type. Each HMM has including parameters indicating state transition probabilities, mean vectors $\mu_s$ and variances $\Sigma_s$, respectively. Each HMM is an HMM of clean speech, namely, an HMM of speech, word, or phoneme including no noise component (Hereinafter, it is referred to as a "clean speech HMM".). Each clean speech HMM is generated by using, for example, a forward-backward algorithm, which is well known in the art, and pre-stored in the speech model memory 4.

The modifying portion 5 operates to modify the clean speech HMMs so as to adapt them to the noisy environment. Concretely, the modifying portion 5 calculates feature parameters Y of the modified clean speech HMMs by using a following equation (6), which is the same as the aforementioned equation (3).

$$Y = k \cdot S + (1-k) \cdot N \quad (0 < k \leq 1), \quad (6)$$

where the "S" is the feature parameter of the clean speech HMM, which is fed from the speech model memory 4. The "N" is the feature parameter of the noise, which is fed from the feature extracting portion 2. The "k" is the value corresponding to the signal-to-noise ratio (mixing ratio) in the car which is running. In addition, the "k" is pre-stored in the speech model memory 4 or a memory device installed in the modifying portion 5.

More concretely, the modifying portion 5 calculates the feature parameters Y of the modified clean speech HMMs in the following manner. First, the modifying portion 5 reads all of the clean speech HHMs stored in the speech model memory 4. Next, the multiplier 10 of the modifying portion 5 multiplies the feature parameter S of the each clean speech HMM by the "k". Next, the multiplier 11 of the modifying portion 5 multiplies the feature parameter N of the noise by the "1–k". Next, the adder 12 of the modifying potion 5 adds the feature parameter S multiplied by the "k" to the feature parameter N multiplied by the "1–k". Thus, the feature parameters Y of the modified clean speech HMMs are calculated.

For example, the mean vectors $\mu_s$ of each clean speech HMM is used as the feature parameter S. The mean vectors $\mu_N$ of the noise are used as the feature parameter N. The mean vectors $\mu_N$ of the noise are calculated on the basis of the cepstrum of the noise in the modifying portion 5 when the feature parameter N of the noise is fed into the modifying potion 5. In this case, the modifying potion 5 calculates mean vectors $\mu_M$ of the modified clean speech HMMs by using an equation (6).

In addition, state transition probabilities, variances $\Sigma$, a set of mean vectors $\mu$ and variances $\Sigma$, or a set of state transition probabilities, mean vectors $\mu$ and variances $\Sigma$ may be used as the feature parameters.

The calculating portion 6 operates to compare the feature parameter X of the input speech signal with each of the feature parameters Y of the modified clean speech HMMs. The calculating portion 6 calculates a probability that the input speech corresponding to the input speech signal is output from each modified clean speech HMM by using a well known HMM technique. Furthermore, a forward algorithm, a viterbi algorithm or the like may be used for this calculating process.

The calculated probabilities are fed as probability data from the calculating portion 6 into the determining portion 7. The determining portion 7 selects one probability data indicating the highest probability from among all the probability data fed from the calculating portion 6. Then, the determining portion 7 identifies the clean speech HMM corresponding to the selected probability data, and outputs the word(s) corresponding to the identified clean speech HMM.

The control portion 8 operates to control the switch 3, the calculating portion 6, and the determining portion 7 by using control signals Sc1, Sc2 and Sc3. The control portion 8 operates according to a control program stored in the ROM 9.

An operation of the speech recognition apparatus 100 will be described. As shown in FIG. 6, a noise Ni in the car is input through the microphone 1, immediately before an input speech signal Si is input, or frequently. As shown in FIG. 4, the input noise Ni is fed into the feature extracting portion 2. Next, the feature parameter N of the input noise is calculated by the feature extracting portion 2, and fed into the modifying portion 5 via the switch 3. In the modifying portion 5, the clean speech HMMs are read from the speech model memory 4, and the feature parameter Y of each modified clean speech HMM is calculated by using the feature parameters N, S, the mixing ratio "k" and the aforementioned equation (6). Then, the modified clean speech HMMs are fed into the calculating portion 6.

Figure 6:
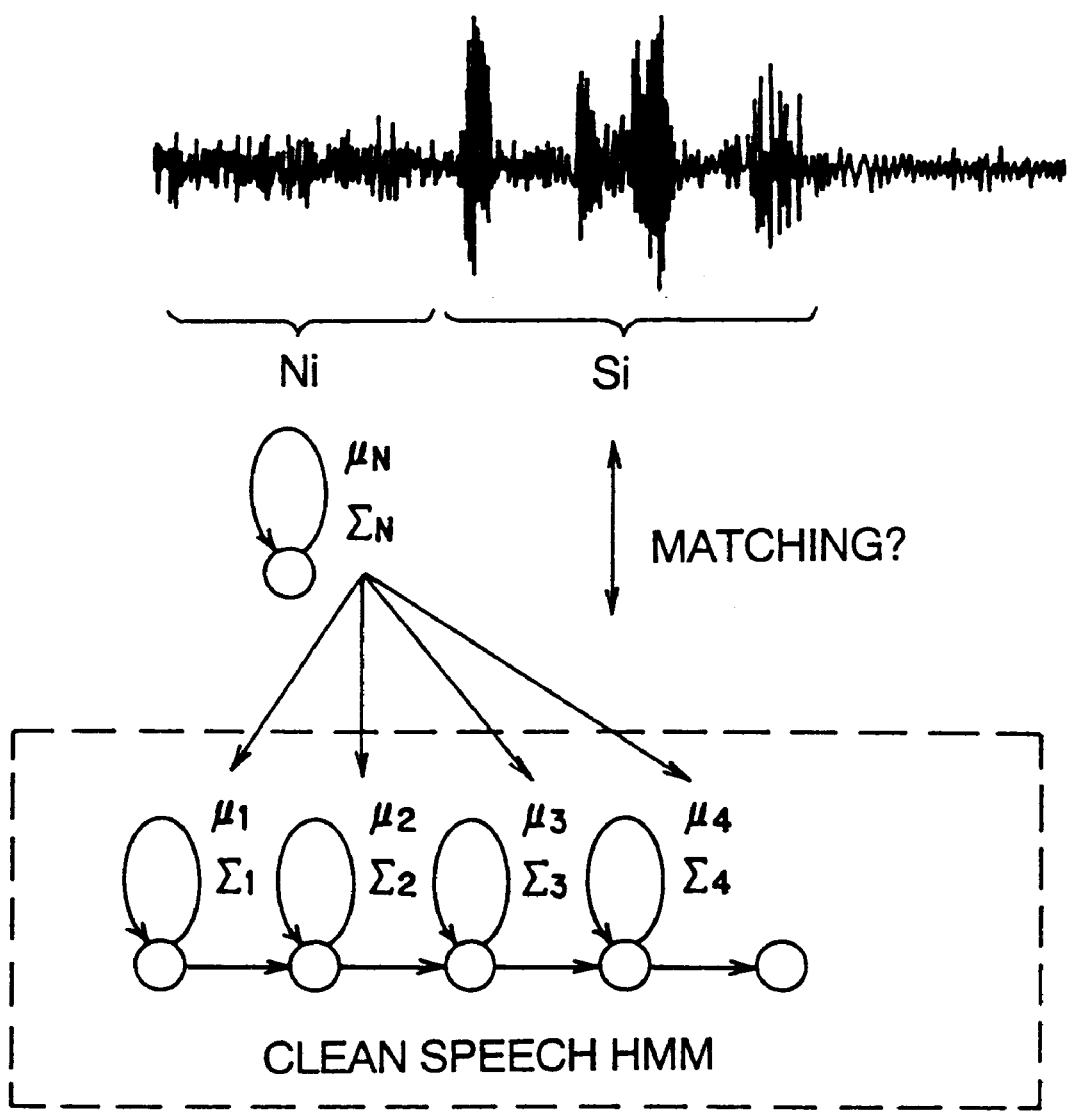
FIG. 6 is a diagram showing an operation of the speech recognition apparatus of the first embodiment.

Immediately after the noise Ni was input through the microphone 1, the input speech signal Si, as shown in FIG. 6, is input through the microphone 1. As shown in FIG. 4, the input speech signal Si is fed into the feature extracting portion 2. Next, the feature parameter X of the input speech signal Si is calculated by the feature extracting portion 2, and fed into the calculating portion 6 via the switch 3. In the calculating portion 6, the feature parameter X of the input speech signal Si is compared with the feature parameter Y of each modified clean speech HMM, and the probability that the input speech corresponding to the input speech signal Si is output is calculated for each modified clean speech HMM. The resultant probabilities are fed as probability data into the determining portion 7. In the determining portion 7, one probability data indicating the highest probability is selected, and the clean speech HMM corresponding to the selected probability data is identified. Next, the word(s) corresponding to the identified clean speech HMM is output. This output word(s) is the result of speech recognition in the speech recognition apparatus 100. This output word(s) indicates the input speech corresponding to the input speech signal Si.

Thus, in the speech recognition apparatus 100 of the first embodiment of the present invention, the clean speech HMMs are modified by using the equation (6) so as to be adapted to the noisy environment, namely, in the car which is running. According to the equation (6), the feature parameter Y of the modified clean speech HMM is calculated by adding the feature parameter N of the input noise to the feature parameter S of the clean speech HMM. The feature parameter N of the input noise is made from the noise that is input immediately before the input speech is input. This means that the feature parameter N of the input noise and the feature parameter X of the input speech signal are detected and calculated at the approximately same time, and further, both feature parameters N and X are detected and calculated in the same noisy environment. Therefore, the feature parameter Y of the modified clean speech HMM represents the feature parameter of the combination of the clean speech HMM and the noise in the noisy environment at the moment. Hence, it is possible to modify the clean speech HMMs so as to match the noisy environment, even if the noisy environment is frequently changed. Consequently, the accurate speech recognition can be achieved. In addition, since the mixing ratio "k" is used for the calculation of the feature parameter Y of the modified clean speech HMM, accuracy of the speech recognition can further increase.

Further, it should be noted an important feature of the speech recognition apparatus 100. This is that the equation (6) is very simple formula. Therefore, the calculation to modify the clean speech HMMs can be quickly performed. Thus, it is possible to increase response speed (i.e., speed of the speech recognition process) of the speech recognition apparatus 100.

3. Second Embodiment of the Invention

Figure 7:
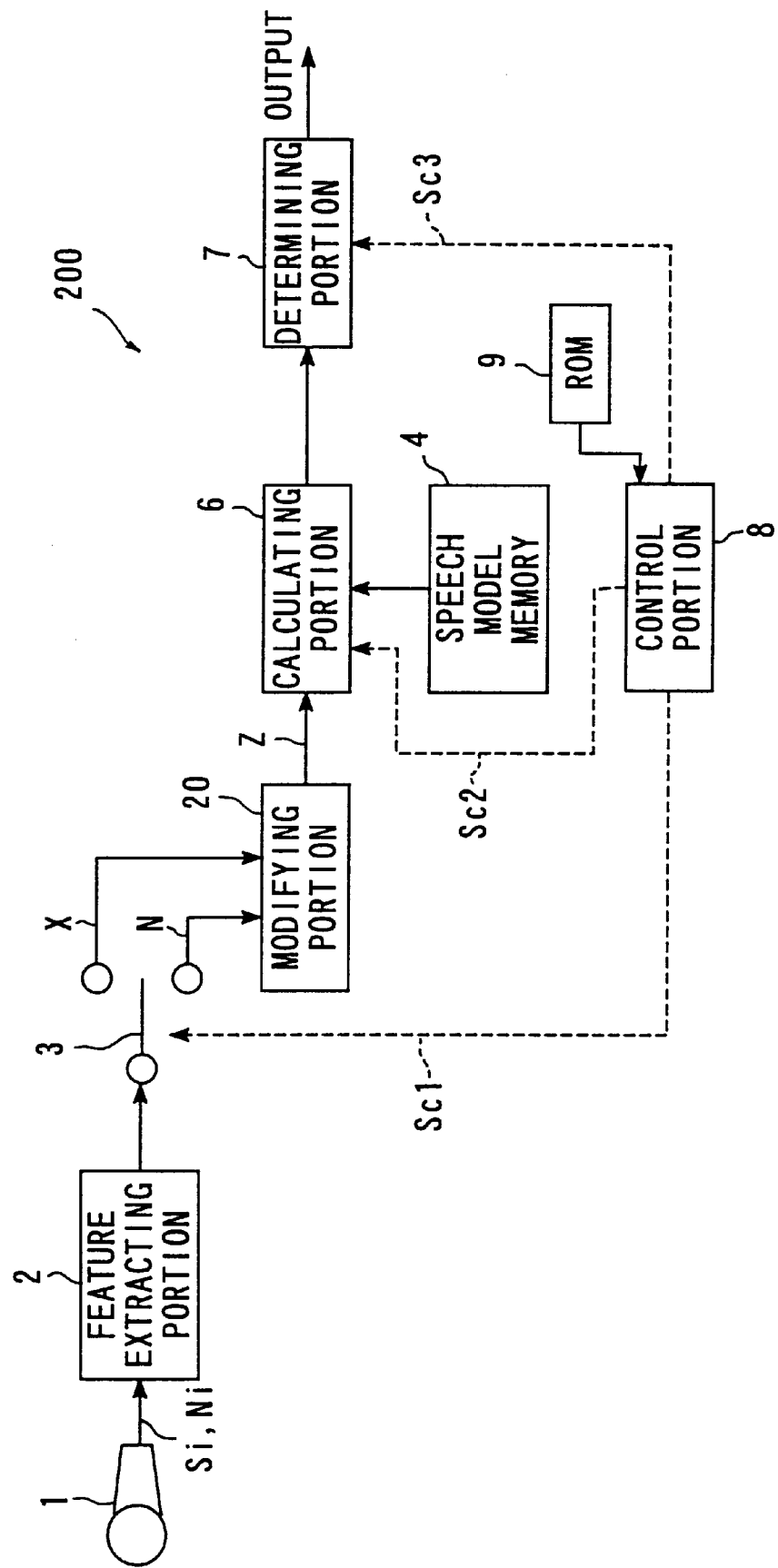
FIG. 7 is a block diagram showing a speech recognition apparatus of a second embodiment of the present invention.
Figure 8:
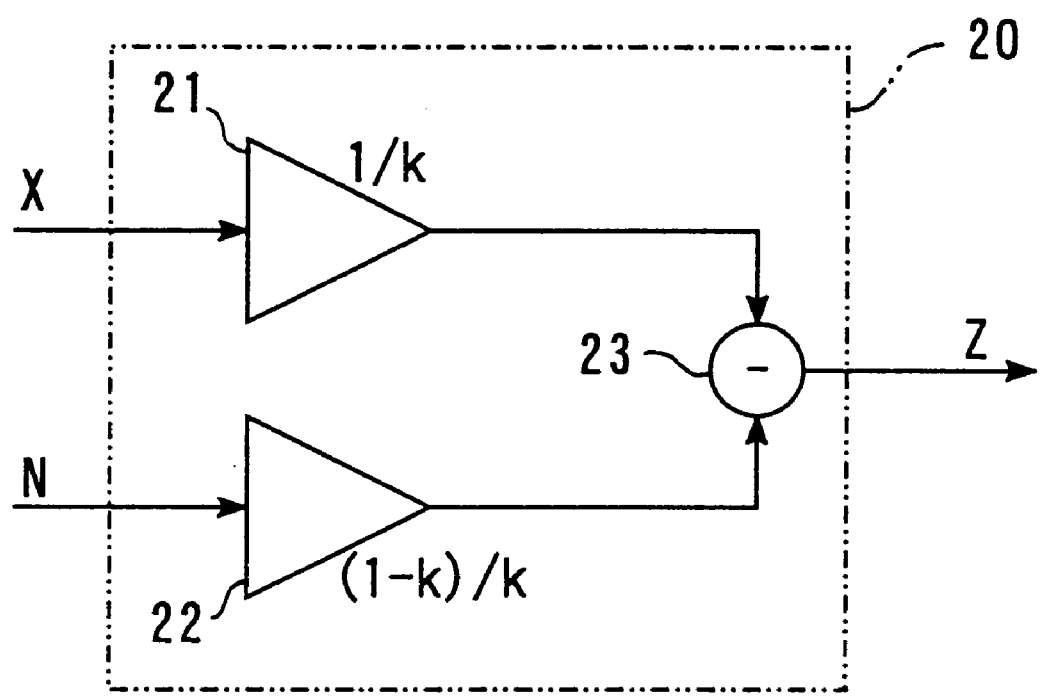
FIG. 8 is a block diagram showing a modifying portion of the speech recognition apparatus of the second embodiment.

Next, the second embodiment of the present invention will be described with reference to FIGS. 7 and 8. In FIGS. 7 and 8, the same constructional elements as those in FIGS. 4 and 5 carry the same reference numbers, and explanations with respect to these elements are omitted.

FIG. 7 shows a speech recognition apparatus 200 of the second embodiment of the present invention. The speech recognition apparatus 200 is mounted in a car. The speech recognition apparatus 200 performs speech recognition in the noisy environment, such as in the car which is running. The speech recognition apparatus 200 performs the speech recognition by using HMMs.

Figure 1:
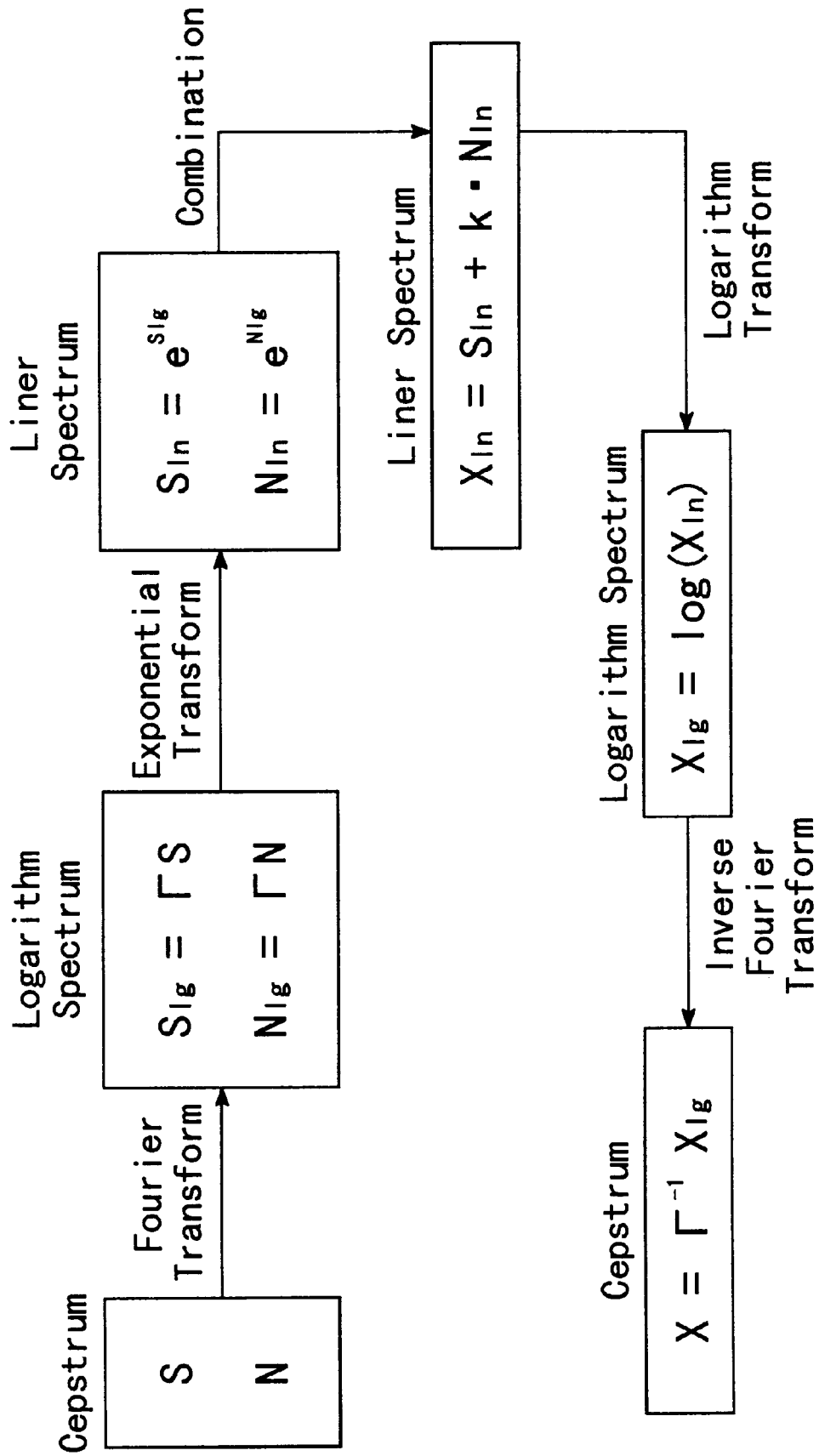
FIG. 1 is a block diagram showing a conventional speech recognition technique.

As shown in FIG. 7, the speech recognition apparatus 200 has the same portions and devices as the speech recognition apparatus 100 of the aforementioned first embodiment (FIG. 1), except for a modifying portion 20. Further, the speech recognition apparatus 200 is different from the speech recognition apparatus 100 in the arrangement of portions and devices and the connecting manner between portions and devices.

The modifying portion 20, as shown in FIG. 8, has a couple of multipliers 21, 22, and a subtracter 23. The modifying portion 20 operates to modify the input speech signal. Concretely, the modifying portion 20 calculates a feature parameter Z of the modified input speech signal by using a following equation (7), which is the same as the aforementioned equation (4).

$$Z=\{X-(1-k)\cdot N\}/k (0<k\leq 1), \quad (7)$$

where the "X" is the feature parameter of the input speech signal, which is fed from the feature extracting portion 2. The "N" is the feature parameter of the noise, which is also fed from the feature extracting portion 2. The "k" is the value corresponding to the signal-to-noise ratio (mixing ratio) in the car which is running. In addition, the "k" is pre-stored in a memory device installed in the modifying portion 20.

More concretely, the modifying portion 20 calculates a feature parameter Z of the modified input speech signal in the following manner. First, the modifying portion 20 accepts the feature parameter N of the input noise from the feature extracting portion 2. Next, the multiplier 22 of the modifying portion 20 multiplies the feature parameter N by the "(1−k)/k". Next, the modifying portion 20 accepts a feature parameter X of the input speech signal from the feature extracting portion 2. Next, the multiplier 21 of the modifying portion 20 multiplies the feature parameter X by the "1/k". Next, the subtracter 23 of the modifying potion 20 subtract the feature parameter N multiplied by the "(1−k)/k" from the feature parameter X multiplied by "1/k". Thus, the feature parameter Z of the modified input speech signal is calculated.

An operation of the speech recognition apparatus 200 will be described. A noise Ni in the car is input through the microphone 1, immediately before an input speech signal Si is input, or frequently. The input noise Ni is fed into the feature extracting portion 2. Next, the feature parameter N of the input noise is calculated by the feature extracting portion 2, and fed into the modifying portion 20 via the switch 3.

Immediately after the noise Ni was input through the microphone 1, the input speech signal Si is input through the microphone 1. The input speech signal Si is fed into the feature extracting portion 2. Next, the feature parameter X of the input speech signal Si is calculated by the feature extracting portion 2, and fed into the modifying portion 20 via the switch 3.

In the modifying portion 20, the feature parameter Z of modified input speech signal is calculated by using the feature parameters N, X, the mixing ratio "k" and the aforementioned equation (7). Then, the feature parameter Z of the modified input speech signal is fed into the calculating portion 6.

In the calculating portion 6, the feature parameter Z of the modified input speech signal is compared with the feature parameter S of each clean speech HMM which is read from the speech model memory 4, and the probability that the input speech corresponding to the input speech signal Si is output is calculated for each clean speech HMM. The resultant probabilities are fed as probability data into the determining portion 7. In the determining portion 7, one probability data indicating the highest probability is selected, and the clean speech HMM corresponding to the selected probability data is identified. Next, the word(s) corresponding to the identified clean speech HMM is output. This output word(s) is the result of speech recognition with the speech recognition apparatus 200. This output word(s) indicates the input speech corresponding to the input speech signal Si.

Thus, in the speech recognition apparatus 200 of the second embodiment of the present invention, the input speech signal is modified by using the equation (7) so as to remove the noise component therefrom. According to the equation (7), the feature parameter Z of the modified input speech signal is calculated by subtracting the feature parameter N of the input noise from the feature parameter X of the input speech signal. The feature parameter N of the input noise is made from the noise that is input immediately before the input speech signal is input. This means that the feature parameter N of the input noise and the feature parameter X of the input speech signal are detected and calculated at the approximately same time, and further, both feature parameters N and X are detected and calculated in the same noisy environment, namely, in the car. Therefore, the noise component can be accurately eliminated from the input speech signal. Hence, the feature parameter Z of the modified input speech signal can be made similar to the feature parameter of the clean speech, even if the noisy environment is frequently changed. Consequently, the accurate speech recognition can be achieved. In addition, since the mixing ratio "k" is used for the calculation of the feature parameter Y of the modified clean speech HMM, accuracy of the speech recognition can further increase.

Further, it should be noted an important feature of the speech recognition apparatus 200. This is that the equation (7) is very simple formula. Therefore, the calculation to modify the input speech signal can be quickly performed. Thus, it is possible to increase response speed (i.e., speed of the speech recognition process) of the speech recognition apparatus 200.

4. Third Embodiment of the Invention

Figure 9:
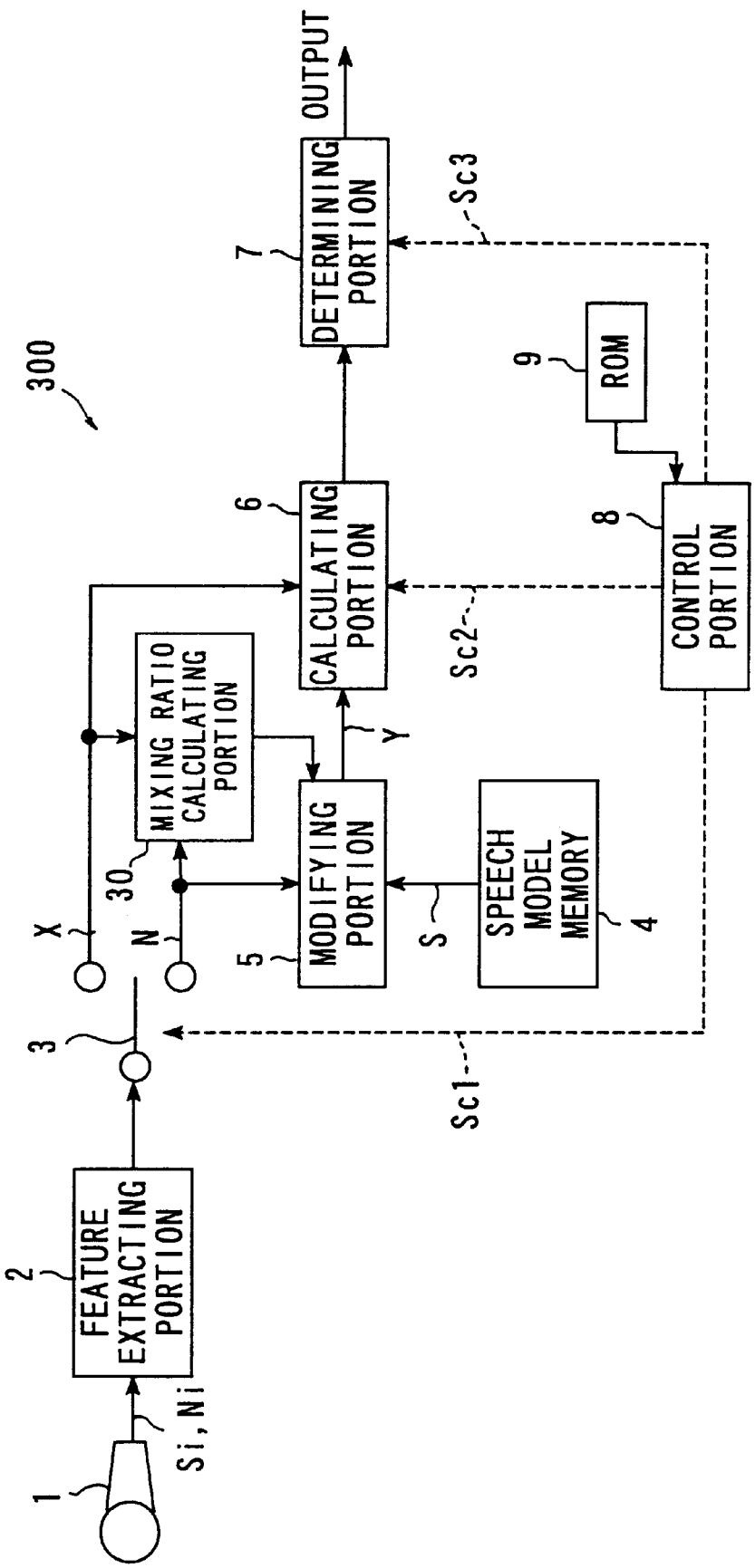
FIG. 9 is a block diagram showing a speech recognition apparatus of a third embodiment of the present invention.
Figure 10:
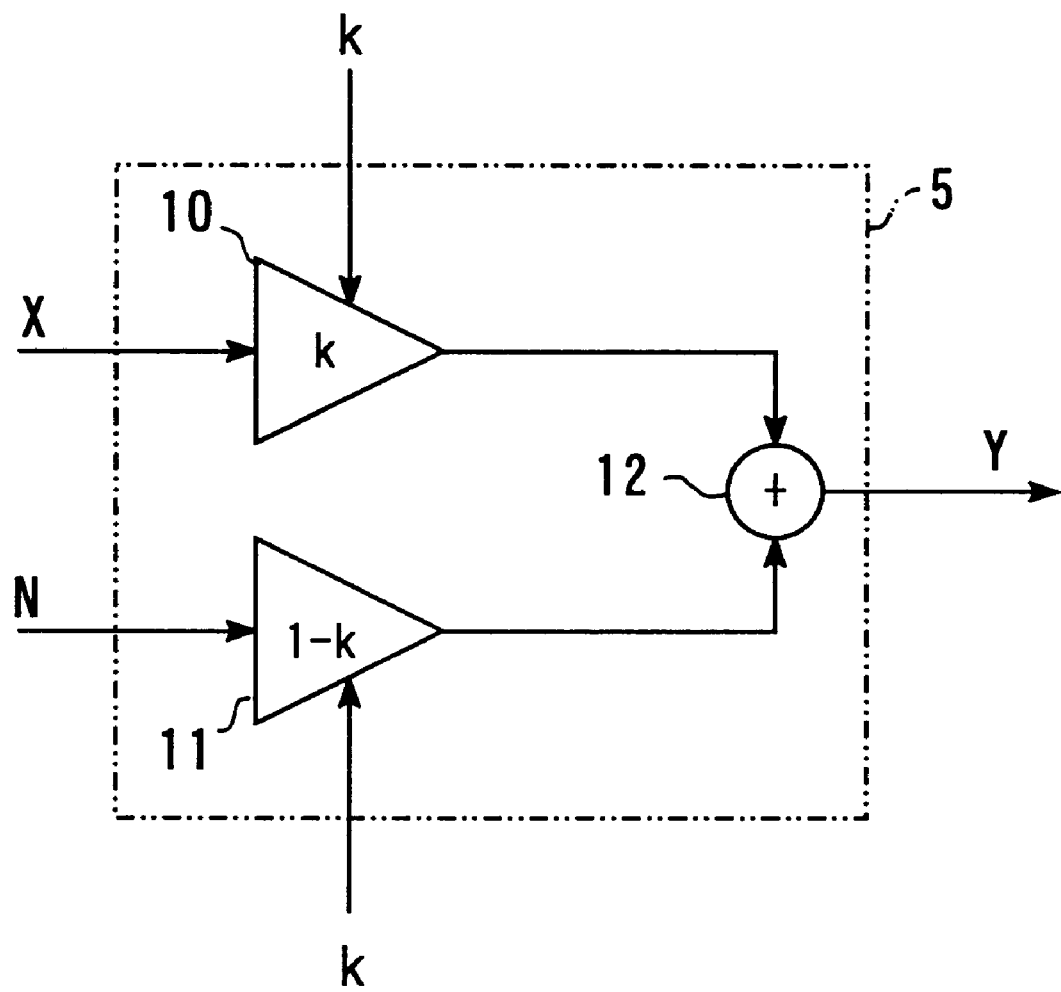
FIG. 10 is a block diagram showing a modifying portion of the speech recognition apparatus of the third embodiment.

Next, the third embodiment of the present invention will be described with reference to FIGS. 9 and 10. In FIGS. 9 and 10, the same constructional elements as those in FIGS. 4 and 5 carry the same reference numbers, and explanations with respect to these elements are omitted.

FIG. 9 shows a speech recognition apparatus 300 of the third embodiment of the present invention. The speech recognition apparatus 300 has the same portions and devices of the speech recognition apparatus 100 of the aforementioned first embodiment. The speech recognition apparatus 300 further has a mixing ratio calculating portion 30.

The mixing ratio calculating portion 30 calculates the mixing ratio "k" on the basis of the feature parameter N of the input noise and the feature parameter X of the input speech signal. The calculated mixing ratio "k" is fed into the multipliers 10 and 11 of the modifying portion 5, as shown in FIG. 10. The modifying portion 5 performs the calculation by using this mixing ratio "k".

According to the speech recognition apparatus 300, the mixing ratio "k" matching the noisy environment can be obtained, and the accuracy of the speech recognition can increase.

In addition, although an HMM is used as a speech model in the speech recognition apparatuses 100, 200 and 300, a standard pattern (i.e., template) may be use as a speech model. Furthermore, the present invention can be adapted to a speech recognition using a DP (Dynamic Programming) matching method.

Furthermore, in the aforementioned speech recognition apparatuses 100, 200 and 300, the control program to control the speech recognition operation is stored in the ROM 9. However, the control program may be read from a storage device, such as an optical disk, a floppy disk and the like, with a reading device, such as an optical disk driver, a floppy disk driver and the like, to perform a speech recognition processes.

5. Examples of Accuracy of Speech Recognition

Next, accuracy of the speech recognition of the aforementioned speech recognition apparatuses 100 and 200 will be described with reference to FIGS. 11 through 13.

The speech recognition of the speech recognition apparatuses 100 and 200 are tested in five environments, namely, (i) in the car which is stopped, (ii) in the car which is running at a speed of 50 km/h without playing music, (iii) in the car which is running at a speed of 100 km/h without playing music, (iv) in the car which is running at a speed of 50 km/h, playing music from a car stereo mounted in the car, (v) in the car which is running at a speed of 100 km/h, playing music from the car stereo. The microphone 1 is attached on the sun visor of the inside of the car. The car is a middle size car of 2000 cc displacement.

FIG. 11 shows accuracy of the speech recognition of the speech recognition apparatus 100 and a conventional speech recognition apparatus 400. The conventional speech recognition apparatus 400 performs the speech recognition by comparing a feature parameter of an input speech signal with a clean speech HMM without the calculation of equation (6) or (7).

As shown in FIG. 11, accuracy of the speech recognition of the speech recognition apparatus 100 is higher than that of the conventional speech recognition apparatus 400 with respect to all of the environments (i) through (v).

Figure 12:
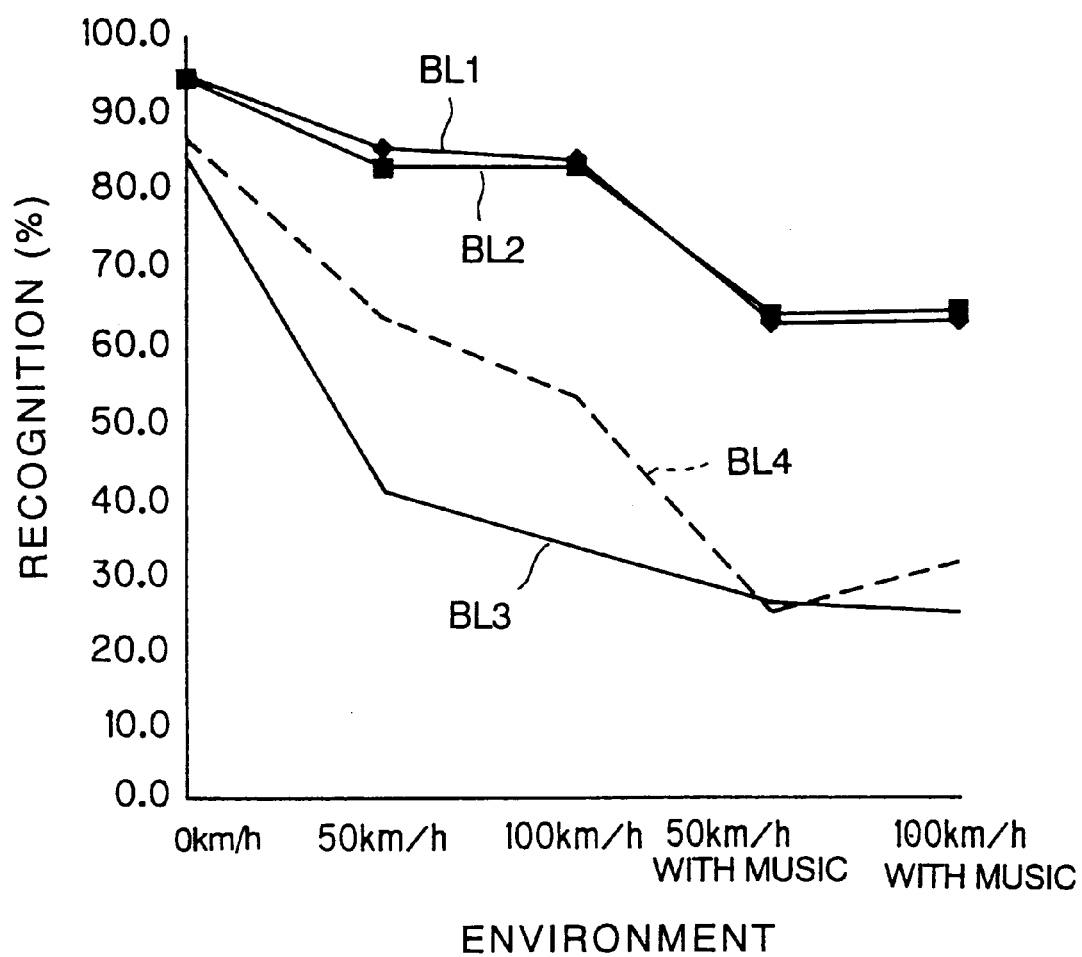
FIG. 12 is a graph showing accuracy of speech recognition in various environments.

FIG. 12 shows accuracy of the speech recognition of the speech recognition apparatuses 100, 200, the conventional speech recognition apparatus 400 and another conventional speech recognition apparatus 500. The conventional speech recognition apparatus 500 performs the speech recognition by using an MMSE (Minimum Mean-Square Error short-time spectral amplitude estimator) process. In the MMSE process, a noise component is subtracted from the spectrum of an input speech signal, and information of a signal-to-noise ratio is added to the input speech signal, before the feature parameter of the input speech signal is compared with the feature parameter of clean speech HMM. In addition, the MMSE process is well known in the art. In FIG. 12, a broken line BL1 represents accuracy of the speech recognition of the speech recognition apparatus 100 of the present invention. A broken line BL2 represents accuracy of the speech recognition of the speech recognition apparatus 200 of the present invention. A broken line BL3 represents accuracy of the speech recognition of the conventional speech recognition apparatus 400. A broken line BL4 represents accuracy of the speech recognition of the conventional speech recognition apparatus 500.

As shown in FIG. 12, accuracy of the speech recognition of the speech recognition apparatuses 100 and 200 are higher than those of the conventional speech recognition apparatuses 400 and 500 with respect to all of the environments (i) through (v). Especially, in the environment (v), namely, in the car which is running at a speed of 100 km/h playing music, the probabilities of accuracy of the speech recognition of the speech recognition apparatuses 100 and 200 are approximately 2.5 times as high as those of the conventional speech recognition apparatuses 400 and 500.

Figure 13:
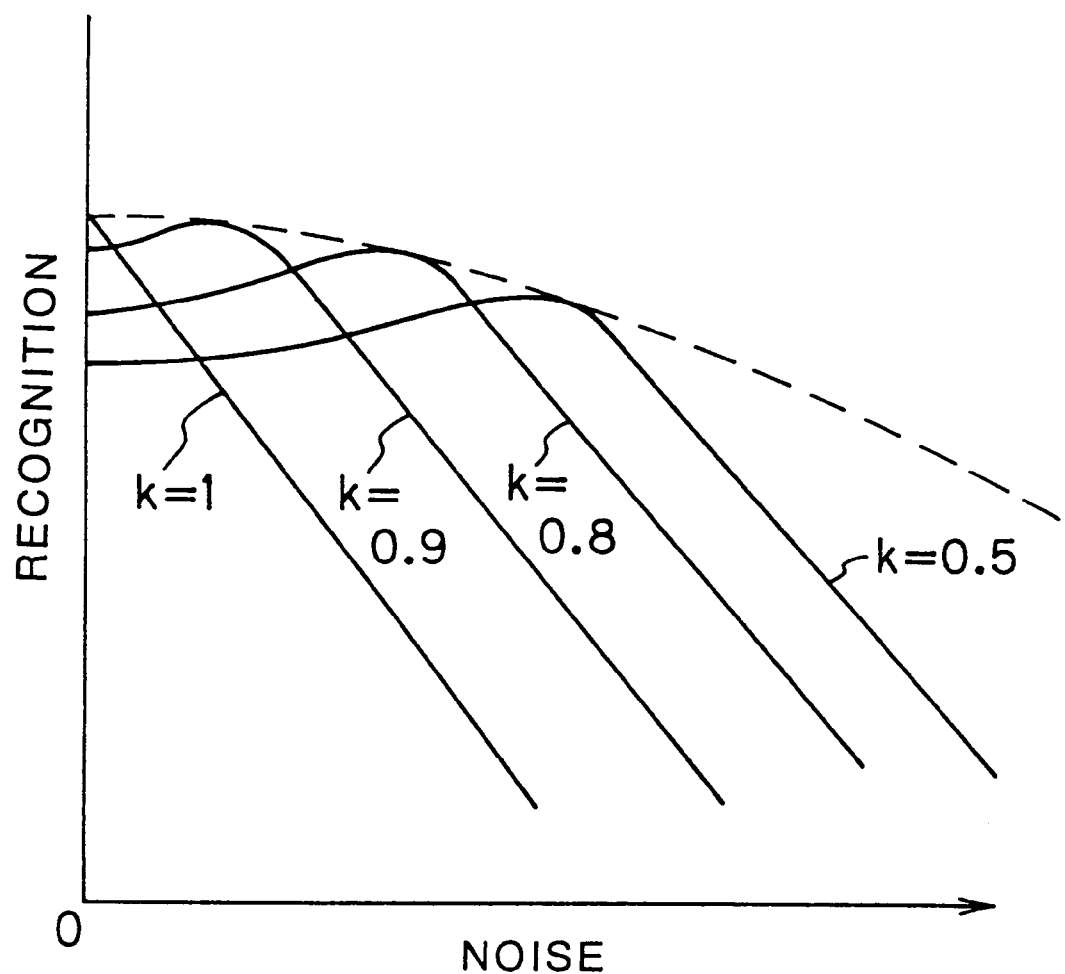
FIG. 13 is a graph showing a relationship between a noise and accuracy of speech recognition when a mixing ratio is changed.

FIG. 13 shows a relationship between a noise and accuracy of the speech recognition of the speech recognition apparatus 100 with respect to k=1, 0.9, 0.8 or 0.5. As shown in FIG. 13, by using the mixing ratio "k" which is a value corresponding to a signal-to-noise ratio in each environment, it is possible to prevent accuracy of the speech recognition from degrading greatly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-290731 filed on Oct. 23, 1997 including the specification, claims, drawings and summary is incorporated herein by reference in its entirety.

What is claimed is:

1. A speech recognition method of recognizing an input speech in a noisy environment by using a plurality of clean speech models, each of said clean speech models having a clean speech feature parameter S representing a cepstrum parameter of a clean speech thereof, said speech recognition method comprising the processes of:

detecting a noise feature parameter N representing a cepstrum parameter of a noise in said noisy environment, immediately before said input speech is input;

detecting an input speech feature parameter X representing a cepstrum parameter of said input speech in said noisy environment;

calculating a modified clean speech feature parameter Y according to a following equation:

$$Y = k \cdot S + (1-k) \cdot N \quad (0 < k \leq 1),$$

where said "k" is a predetermined value corresponding to a signal-to-noise ratio in said noise environment;

comparing said input speech feature parameter X with said modified clean speech feature parameter Y; and recognizing said input speech by repeatedly carrying out said calculating process and said comparing process, respectively, with respect to said plurality of clean speech models.

2. A speech recognition method according to claim 1, wherein said plurality of clean speech models are continuous hidden Morkav models each including parameters indicating state transition probabilities, mean vectors and variances, respectively.

3. A speech recognition method of recognizing an input speech in a noisy environment by using a plurality of clean speech models, each of said clean speech models having a clean speech feature parameter S representing a cepstrum parameter of a clean speech thereof, said speech recognition method comprising the processes of:

detecting a noise feature parameter N representing a cepstrum parameter of a noise in said noisy environment, immediately before said input speech is input;

detecting an input speech feature parameter X representing a cepstrum parameter of said input speech in said noisy environment;

calculating a modified input speech feature parameter Z according to a following equation:

$$Z=\{X-(1-k)\cdot N\}/k\ (0<k\leq 1),$$

where said "k" is a predetermined value corresponding to a signal-to-noise ratio in said noise environment;

comparing said modified input speech feature parameter Z with said clean speech feature parameter S; and recognizing said input speech by repeatedly carrying out said calculating process and said comparing process, respectively, with respect to said plurality of clean speech models.

4. A speech recognition method according to claim 3, wherein said plurality of clean speech models are continuous hidden Morkav models each including parameters indicating state transition probabilities, mean vectors and variances, respectively.

5. A speech recognition apparatus for recognizing an input speech in a noisy environment by using a plurality of clean speech models, each of said clean speech models having a clean speech feature parameter S representing a cepstrum parameter of a clean speech thereof, said speech recognition apparatus comprising:

a first detecting device for detecting a noise feature parameter N representing a cepstrum parameter of a noise in said noisy environment, immediately before said input speech is input;

a second detecting device for detecting an input speech feature parameter X representing a cepstrum parameter of said input speech in said noisy environment;

a calculating device for calculating a modified clean speech feature parameter Y according to a following equation:

$$Y=k\cdot S+(1-k)\cdot N\ (0<k\leq 1),$$

where said "k" is a predetermined value corresponding to a signal-to-noise ratio in said noise environment; and a comparing device for comparing said input speech feature parameter X with said modified clean speech feature parameter Y in order to recognize said input speech.

6. A speech recognition apparatus according to claim 5, wherein said plurality of clean speech models are continuous hidden Morkav models each including parameters indicating state transition probabilities, mean vectors and variances, respectively.

7. A speech recognition apparatus for recognizing an input speech in a noisy environment by using a plurality of clean speech models, each of said clean speech models having a clean speech feature parameter S representing a cepstrum parameter of a clean speech thereof, said speech recognition apparatus comprising:

a first detecting device for detecting a noise feature parameter N representing a cepstrum parameter of a noise in said noisy environment, immediately before said input speech is input;

a second detecting device for detecting an input speech feature parameter X representing a cepstrum parameter of said input speech in said noisy environment;

a calculating device for calculating a modified input speech feature parameter Z according to a following equation:

$$Z=\{X-(1-k)\cdot N\}/k\ (0<k\leq 1),$$

where said "k" is a predetermined value corresponding to a signal-to-noise ratio in said noise environment; and a comparing device for comparing said modified input speech feature parameter Z with said clean speech feature parameter S in order to recognize said input speech.

8. A speech recognition apparatus according to claim 7, wherein said plurality of clean speech models are continuous hidden Morkav models each including parameters indicating state transition probabilities, mean vectors and variances, respectively.

9. A program storage device readable by a speech recognition apparatus tangibly embodying a program of instruction executable by said speech recognition apparatus to perform method processes for recognizing an input speech in a noisy environment by using a plurality of clean speech models, each of said clean speech models having a clean speech feature parameter S representing a cepstrum parameter of a clean speech thereof, said method processes comprising:

detecting a noise feature parameter N representing a cepstrum parameter of a noise in said noisy environment, immediately before said input speech is input;

detecting an input speech feature parameter X representing a cepstrum parameter of said input speech in said noisy environment;

calculating a modified clean speech feature parameter Y according to a following equation:

$$Y=k\cdot S+(1-k)\cdot N\ (0<k\leq 1),$$

where said "k" is a predetermined value corresponding to a signal-to-noise ratio in said noise environment;

comparing said input speech feature parameter X with said modified clean speech feature parameter Y; and recognizing said input speech by repeatedly carrying out said calculating process and said comparing process, respectively, with respect to said plurality of clean speech models.

10. A program storage device according to claim 9, wherein said plurality of clean speech models are continuous hidden Morkav models each including parameters indicating state transition probabilities, mean vectors and variances, respectively.

11. A program storage device readable by a speech recognition apparatus tangibly embodying a program of instruction executable by said speech recognition apparatus to perform method processes for recognizing an input speech in a noisy environment by using a plurality of clean speech models, each of said clean speech models having a clean speech feature parameter S representing a cepstrum parameter of a clean speech thereof, said method processes comprising:

detecting a noise feature parameter N representing a cepstrum parameter of a noise in said noisy environment, immediately before said input speech is input;

detecting an input speech feature parameter X representing a cepstrum parameter of said input speech in said noisy environment;

calculating a modified input speech feature parameter Z according to a following equation:

$$Z=\{X-(1-k)\cdot N\}/k \ (0<k\leq 1),$$

where said "k" is a predetermined value corresponding to a signal-to-noise ratio in said noise environment;

comparing said modified input speech feature parameter Z with said clean speech feature parameter S; and recognizing said input speech by repeatedly carrying out said calculating process and said comparing process, respectively, with respect to said plurality of clean speech models.

12. A program storage device according to claim 11, wherein said plurality of clean speech models are continuous hidden Morkav models each including parameters indicating state transition probabilities, mean vectors and variances, respectively.

* * * * *